United States Patent Office 3,385,693
Patented May 28, 1968

3,385,693
METHOD FOR CONTROLLING GROWTH OF SEEDLING WEED GRASSES
Raymond W. Luckenbaugh, Wilmington, Del., assignor to E. I. du Pont de Nemours and Company, Wilmington, Del., a corporation of Delaware
No Drawing. Filed July 22, 1965, Ser. No. 474,149
The portion of the term of the patent subsequent to Mar. 14, 1984, has been disclaimed
6 Claims. (Cl. 71—120)

ABSTRACT OF THE DISCLOSURE

Controlling grass weeds with compounds of the formula:

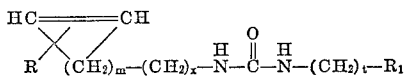

wherein
R is hydrogen or methyl;
$R_1$ is aryl, cylcoalkyl, bicycloalkyl or cycloalkenyl;
m is 3 through 6;
t is 0 or 1; and
x is 0 or 1.

---

This invention relates to methods of destroying weeds.

More specifically, this invention refers to methods for employing 1 - cycloalkenyl - 3-cycloalkylureas, 1-cycloalkenyl-3-phenylureas and 1,3-dicycloalkenylureas for selectively controlling crabgrass and other germinating and seedling weed grasses.

I have discovered that by applying such compounds in a pre-emergence or post-emergence treatment to an area in which crabgrass is growing there results a marked growth control of the germinating or seedling crabgrass plant. Established and germinating turf grasses such as Kentucky bluegrass, bentgrass and creeping fescues show only slight temporary retardation of growth and no injury.

Specifically, the compounds of my invention which have the ability to control the growth of crabgrass and other germinating and seedling weed grasses are represented by the formula:

(I)

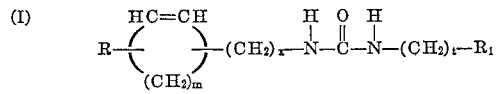

wherein R is hydrogen or methyl;
$R_1$ is

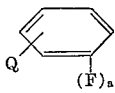

saturated cycloalkyl containing 5 through 8 carbon atoms; saturated bicycloalkyl containing 7 through 8 carbons atoms; monomethyl-, dimethyl-, monohalo-, dihalo- or monomethyldihalosubstituted saturated cycloalkyl containing 5 through 8 carbon atoms or saturated bicycloalkyl containing 7 through 8 carbon atoms; cycloalkenyl containing 5 through 8 carbon atoms; or methylsubstituted cycloalkenyl where the cycloalkenyl radical contains 5 through 8 carbon atoms; with the limitation that the radicals attached to the 1 and 3 positions of the urea moiety must be different when t and x are both 0;
a is 0 or 1;
m is a whole integer more than 2 and less than 7;
t is 0 or 1;
x is 0 or 1; and
Q is hydrogen or methyl.

An outstanding feature of the compounds of this invention is their selective pre-emergence elimination of several annual seedling grasses from other grasses. For example, treatment at the time of seeding a new turf will control crabgrass and some other annual grasses without injury to the germinating seeds of common temperate region turf species. The extent of this tolerance of desirable turf grasses has been most strikingly demonstrated by the successful dry application of mixtures of turf seed and chemical to a prepared seedbed. Such applications have controlled annual weed grasses yet permitted the normal establishment of the new turf.

The selective control of some grasses with safety to seeds and seedlings of other grasses also extends to field crops. Applications pre-emergence to the crop control such weeds as crabgrass, Digitaria sp.; foxtail, Seteria faberii, and cheat, Bromus tectorum in wheat and rice.

Preferred groups of compounds because of their outstanding action in retarding the growth of crabgrass at low rates are:

(II)

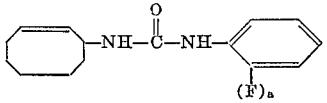

a is 0 or 1.

Compounds of my invention retard the growth of many annual weed grasses and some perennial weed grasses such as Johnsongrass, Sorghum halepense; Bermudagrass, Cynodon doctylon and the like. I have noticed that the effect on perennial weed grasses is often limited to plants growing from seed. If the perennial weed has developed rhizomes the compound has a less pronounced effect on the plants.

An annual grass is defined in the Journal of the Weed Society of America, vol. 10, #3, July 1962, as any grass plant that completes its life cycle from seed in one year.

For the purposes of this specification, perennial weed grasses growing from seed such as Bermudagrass, nimblewill and Johnsongrass are also stated generically to be "seedling weed grasses."

Weeds are defined as any unwanted plant. For the purposes of this specification it is assumed that annual grasses that are commonly cultivated such as ryegrass, wheat, barley and oats are not weeds.

A wide range of plants are not seriously injured by the compounds used in this invention. Accordingly, the above weeds are controlled selectively, i.e., without substantial adverse effect on the majority of species in the plant kingdom. Examples of vegetation that are not seriously injured by the compounds used in my invention include the turf grasses described above; annual crop grasses such as wheat, sorghum, corn and rice and perennial crop grasses such as sugar cane; ornamentals such as marigolds, tulips, arbor vitae, azalea, boxwood, camellia, flowering crab, deutzia, forsythia, Chinese holly, Japanese holly, Tartarian honeysuckle, privet, pyracantha, climbing rose, tea rose, spiraea and other shrubs; trees such as oaks, Q. alba, Q. borealis, and Q. volutina, beech, dogwood, hickory, Norway spruce, black gum, sweet gum, tulip tree, maple and pine; and broadleaf crops such as beets, eggplant, flax, green beans, lima beans, okra, peppers, red beets, safflower, soybeans, spinach, sugar beets, alfalfa, clover, lespedeza, tobacco, peanuts, carrots, tomatoes, squash, cucumber, potatoes and cotton.

Established plants of many plant species particularly those past the three leaf stage are not affected by the compounds used in my invention.

PREPARATION

The 1-cycloalkenyl-3-phenylureas of this invention are prepared by the reaction of phenyl, o-fluorophenyl or tolylisocyanates with the appropriate cycloalkenylamine. The general literature methods for preparation of cycloalkenylamines are described in the following references:

2-cyclopenten-1-ylamine

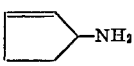

Org. Snyth. IV, 238(1963).

3 (or 4 cyclopenten-1-ylamine

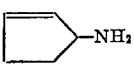

Kraemer, et al. Ber. 29, 557.

2-cyclopenten-1-methylamine

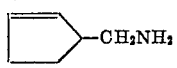

I. N. Nazarov, et al. Zhur. Obshchei Khim 29, 767 (1959) C.A. 54, 1348 (1960).
B.P. 134° C. $n_D^{21}$ 1.4750.
H. J. Schnerdir, et al. Angeu. Chem. 74 388(1962) C.A. 57, 8447 (1962).
B.P. 48–50° C./12 mm.

1-cyclohexen-1-ylamine

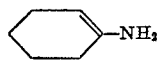

B. A. Dolgoplosk, et al. Zhur. Obshchei Khim 24, 1775 (1954) C.A. 49 12339 (1955).

2-cyclohexen-1-ylamine

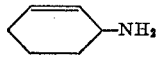

L. Goodman, et al. J. Am. Chem. Soc. 80, 4312 (1958).
B.P. 139–140° C.
$n_D^{25}$ 1.4822

3-cyclohexen-1-ylamine

L. Goodman, et al. J. Am. Chem. Soc. 80, 4312 (1958).
B.P. 73–75.4° C./87 mm.
$n_D^{25}$ 1.4816.

1-cyclohexen-1-methylamine

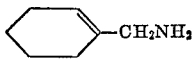

J. Colonge, et al. Compt. renel 251, 1080 (1960).
B.P. 55–57° C./12 mm.

3-cyclohexen-1-methylamine

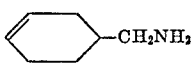

L. Bengle, U.S. 2,818,431.
B.P. 74–76° C./29 mm.

2-cyclohepten-1-ylamine

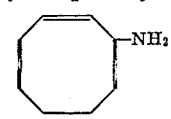

Willstatter Ann. 317,243.
B.P. 166° C.

2-cycloocten-1-ylamine

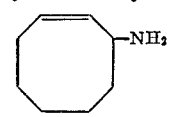

P. E. Fanta et al. J. Org. Chem. 28, 416 (1963).
B.P. 55° C./2.6 mm.

4-cycloocten-1-ylamine

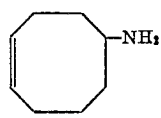

K. Ziegher, et al, Ann. 589, 122 (1954) C.A. 49, 13077f (1955) describes an isomer having B.P. 88.5–89.5° C./22 mm. $n_D^{20}$ 1.4937.

2-methyl-2-cyclohexen-1-ylamine

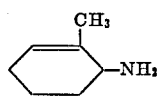

The "Br" intermediate for this amine is found in the following reference:
Bull. Soc. Chem. France 1950, 106.

4-methyl-2-cyclohexen-1-ylamine or 5-methyl-2-cyclohex-1-ylamine

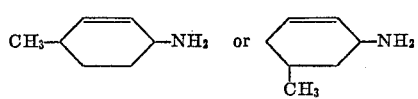

3,5-dibromo-1-methylcyclohexen is found in the following reference:
Harriss, Ann. 395, 254.

Typical of the method of preparation of the 1-cycloalkenyl-3-phenylurea compounds of this invention is the reaction of the phenyl or substituted phenylisocyanate with the appropriate cycloalkenylamine in an inert solvent such as toluene or hexane. The exothermic reaction is usually controlled by the rate of addition of the isocyanate to the amine or by external cooling. The products can be isolated by evaporation of the solvent from the reaction mixture, or by diluting the reaction mixture with an aliphatic hydrocarbon such as n-pentane. The products are crystalline solids.

The method used to prepare the 1-cycloalkenyl-3-cycloalkylurea and 1,3-dicycloalkenylurea compounds of this invention is described by the following equation wherein the symbols have the same meaning as in Formula I.

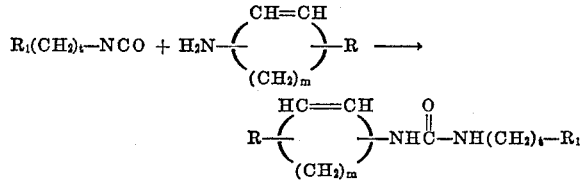

The cycloalkenylamine is dissolved in an inert solvent such as n-hexane, toluene, dioxane or the like and reacted with the corresponding cycloalkylisocyanate or cycloalkenylisocyanate at normal temperatures, for example 10–100° C., preferably at 25–45° C.

In some instances mixtures of isomers are obtained and can be used in the procedures of this invention. The economical means of preparing the methylcycloalkenylamine results in a mixture of cis and trans isomers. No separation of the isomers is needed.

The compounds of this invention also form 1/1 addition compounds with acids, for example, such acids as described in my United States application Ser. No. 161,410 filed Dec. 22, 1961, now abandoned. Particularly of interest are trichloroacetic acid and dodecylbenzenesulfonic acid.

The addition compounds can be prepared by mixing equal molar proportions of the acid and urea in an inert anhydrous solvent such as xylene at room temperature.

Additionally, phenol cycloalkenylphenylurea complexes are formed from phenols which are described in Cupery U.S. Patent No. 2,705,195.

COMPOSITIONS

Compositions of this invention comprise a compound of this invention together with one or more surface-active agents.

The surface-active agent used in this invention can be a wetting, dispersing or an emulsifying agent which will assist dispersion of the compound. The surface-active agent or surfactant can include such anionic, cationic and non-ionic agents as have heretofore been generally employed in plant control compositions of similar type. A detailed list of such agents is set forth in "Detergents and Emulsifiers Annual" (1964) by John W. McCutcheon, Inc. The disclosure in this text is herein incorporated by reference.

Suitable surface-active agents for use in compositions of the present invention are: polyethylene glycol fatty acid esters and fatty alkylol amide condensates, alkylaryl sulfonates, fatty alcohol sulfates, dialkyl esters of sodium sulfosuccinate, fatty acid esters of sodium isethionate, polyoxyethylene ethers and thioethers and long chain quaternary ammonium chloride compounds.

Surface-active dispersing agents such as sodium lignin sulfonates, low viscosity methyl cellulose, polymerized sodium salts of alkylnapthalene sulfonic acids are also suitable in the herbicidal compositions of this invention.

Among the more preferred surfactants are the anionic and non-ionic type. Among the anionic surface-active agents, preferred ones are alkali metal or amine salts of alkylbenzene, lauryl sulfate, alkylnaphthalene sulfonates, sodium N-methyl-N-oleoyltaurate, oleic acid ester of sodium isethionate, dioctyl sodium sulfosuccinate, sodium dodecyldiphenyloxide disulfonate. Among the non-ionic compounds, preferred members are alkylphenoxy poly (ethyleneoxy)ethanols such as nonylphenol adducts with ethylene oxide; trimethylnonyl polyethylene glycol ethers, polyethylene oxide adducts of fatty and rosin acids, long chain alkyl mercaptan adducts with ethylene oxide and polyethylene oxide adducts with sorbitan fatty acid esters.

In general, less than 10% by weight of the surface-active agents will be used in compositions of this invention and ordinarily the amount of surface-active agents will range from 1–5% but may even be less than 1% by weight.

Additional surface-active agents can be added to the above formulation to increase the ratio of surface-active agent: active agent up to as high as 5:1 by weight. Normally the purpose of adding higher amounts of surfactant is to increase the growth controlling effect of the active compounds. When used at higher rates it is preferred that the surfactant be present in the range of one fifth to five parts surfactant for each one part of active agent.

Plant growth control compositions of this invention can contain, in addition to a surfactant, finely divided inert diluents such as talcs, natural clays including attapulgite clay and kaolinite clay, pyrophyllite, diatomaceous earths, synthetic fine silicas, calcium silicate, carbonates, calcium phosphates, sulfur, lime and such flours as walnut shell, wheat, redwood, soybean and cottonseed.

Preferred diluents are clays of hydrated aluminum silicate, hydrated aluminum magnesium silicate and hydrated aluminum magnesium iron silicate.

The amount of the finely divided inert solid diluent can vary widely but will generally range from 10 to 98% by weight of the composition. The particle size can vary considerably but will ordinarily be somewhat under 50 microns in the finished formulation. Such compositions are prepared by blending the ingredients and grinding in a hammer mill or an air attrition mill or similar device until uniform powders are obtained which have a particle size smaller than 50 microns. Compositions containing a surface-active agent and a solid inert diluent are preferably wettable powders containing from 25 to 50% of an alkenyl compound of Formula I.

The compounds of this invention can also be formulated as high strength compositions in which the active ingredient is present in amounts ranging from 90–99%. The remainder of the composition comprises surface-active agents, preferably in amounts of from 0.2 to 2% and diluents, as described above. Such compositions are prepared by blending and grinding the ingredients to obtain a homogeneous powder of fine particle size.

Compositions containing a compound of Formula I and inert solid diluent can also be formulated into granules and pellets. In such compositions, the diluent will generally range from 65 to 99% and the active ingredient can range from 1 to 35%. It should be understood that it will not be necessary to include a surfactant in the granular and pelletized composition. To prepare granules the herbicides can be dissolved in a solvent, and this solution can be sprayed over pre-formed clay granules, expanded vermiculite or the like while agitating the mixture to distribute the active ingredient over and throughout the granular mass. Such granules can range in particle size of from +60 mesh to +4 mesh, and an active ingredient content of 1 to 6% is preferred. It is also possible to make such granules by mixing the finely divided diluent and finely divided herbicide, for instance by grinding together, and then forming granules by adding water, tumbling and drying the resulting spheres.

Pellets are prepared by extruding a mixture that comprises the compound from Formula I, pelleting clay diluent and water into strands, cutting these, and drying the product. Pellet size can range from 10 mesh to larger shapes such as ⅜ inch cubes. Pellets preferably contain from 5 to 35% of the active compound. In addition to the diluents, pelletized and granular compositions can contain additives such as binders, surfactants and the like.

In addition to the formulation described above, suspension concentrates can also be prepared. These formulations are prepared by wet milling the ingredients; i.e., ball milling or by sand grinding using the method described in Hochberg U.S. Patent 2,581,414, issued Aug. 19, 1948, or Littler U.S. Patent 3,060,084 issued Oct. 23, 1962. Using the methods described in these patents, fine particles of the active compounds within the scope of this invention will be dispersed evenly in a diluent. Such compositions normally contain from 15 to 50% active ingredient and are characterized by having particles which are substantially less than 5–20 microns in diameter.

Water extendable oil compositions can also be employed with one or more of the compounds of this invention. In these plant growth controlling compositions, surface-active agents and an oil form a liquid which can be conveniently poured and measured. Such solutions can be mixed with water at the point of application to form an emulsion containing the herbicide and the surface-active agent. Such compositions have the advantage that the oil will often act as a foam inhibitor and thus reduce the tendency for large amounts of surfactants to form objectionable foam. These oil formulations can be either dispersions of the active compound in finely divided form in non-solvent carriers, or they can be solutions in solvent carriers. A non-solvent carrier is an oil in which the urea has low solubility, for instance less than about 0.1% at 25° C. Many aliphatic hydrocarbons are examples of such non-solvent carriers. Solvent carriers include toluene, kerosene, xylene, alkylated naphthalenes, DMF, N-methylpyrrolidone, cyclohexanone, isophorone and the like. Preferably, the oils should be water immiscible and be of a type in which the active agent will be soluble in the amounts used in particular formulations. The dispersions are prepared by wet-milling the ingredients, for example, in a ball mill or sand mill. The solutions are prepared by blending and agitating the ingredients, possibly with application of heat.

In these emulsifiable oil concentrates, the compound of Formula I is present in amounts ranging from 5 to 35% by weight. Precise concentrations of active agent, of course, will depend on the intended use of the composition. The final formulation is prepared at the point of application. The oil concentrate is diluted with water so that the active compound is present in amounts ranging from 0.5% to 2% by weight. Foliage application of the emulsifiable compositions controls the growth of several undesirable annual grass species along highway and railroad rights-of-way, as well as other locations.

It is, of course, also possible to use such oil compositions of the active ingredient by extending them with other oils, for example, diesel oil, herbicidal oil, and the like for uses such as weed control on railroad rights-of-way.

The active compound of my invention also can be formulated with perennial grass seeds to obtain dry coated seeds. Germination of perennial grass seed such as fescues is not hindered. Crabgrass seeds situated near the coated perennial seeds will not produce adult crabgrass plants.

Stickers can be employed to attach finely ground or pulverulent compounds of Formula I to the seed surface. The stickers can be selected from a broad class of adhesives gums, resins and film-forming latexes. Aqueous solutions of natural and synthetic gums and resins can be employed such as gum Arabic, gum tragacanth, Guar gum, ammonium or alkali metal alginates, ammonium or alkali metal acrylates, polyvinyl alcohol, cellulose derivatives, such as hydroxyethyl cellulose or methyl cellulose and the like. Suspensions and solutions of starch and starch derivatives can also be used. Among the film-forming latexes that are useful as stickers are natural or synthetic rubber latex, polystyrene latex, polyacrylate latex, polyethylene latex and the like. Among these latexes a modified polyacrylic latex sold under the tradename of "Rhoplex" and a polyethylene latex sold under the tradename of "Plyac" are preferred. Water-soluble adhesives such as those which are conventionally used in paper manufacture can be employed advantageously. Clays that have binding action such as montmorillonite can also be employed.

The amount of sticker required in the compositions of this invention can range from 0.25% to 50% by weight based on the weight of the active compound. Generally a level of 1 to 10% by weight of sticker based on the weight of the active compound is preferred.

APPLICATION

The compounds of this invention are applied directly to the soil as pre-emergence or as post-emergence treatments or to grass foliage as a post-emergence treatment. They also can be mixed intimately with the soil in pre-emergence treatments. A growth controlling amount of compound of Formula I is in the range of ½ to 20 pounds per acre and is preferably in the range of 1 to 15 pounds per acre to control the seedling weed grasses described above. Rates as high as 24 pounds have been used in tests on established turf grasses without undersirable injury.

More specifically, as a pre-emergence application on crop lands, 2 to 8 pounds per acre of a compound of this invention will control the growth of weed grasses. There is a good safety margin to crop plants such as cucumbers, cotton, potates, flax, squash, lima beans, corn, eggplants, red clover, ryegrass, tomatoes, lespedeza, peppers, soybeans, red beets, alfalfa, sugar beets, green beans, carrots, peanuts, okra and the like. The weed grass usually emerges and then fails to develop, showing symptoms of severe growth retardation. It is particularly surprising to note that the compounds of my invention retard a weed grass such as crabgrass without harming cultivated annual grasses such as ryegrass.

As an application on established growing lawns before a weed grass such as crabgrass appears, growth of crabgrass is controlled with 2 to 16 pounds of active ingredient per acre. There is no injury to established Kentucky bluegrass, bentgrass, creeping red fescue or common Bermuda grass growing from rhizomes. The crabgrass emerges and then fails to develop.

As an application on lawn areas, before, during or after seeding the lawn grasses and before the lawn grasses and crabgrass have emerged, 2 to 8 pounds of active ingredient per acre prevents the development of crabgrass. There is no undesirable effect on the development of Kentucky bluegrass, bentgrass or creeping red fescue.

As a directed post-emergence application on crop lands at any time from the moment the weeds emerge to the three leaf stage, 2 to 8 pounds per acre of active ingredient will prevent the further development of the weed grass. There is no perceptible injury to crop plants such as cucumbers, cotton, potatoes, flax, squash, lima beans, eggplant, red clover, tomatoes, lespedeza, peppers, soybeans, red beets, alfalfa, sugar beets, green beans, carrots, peanuts, okra, corn and the like.

As an application on newly seeded lawns after the lawn grasses and weed grass such as crabgrass have appeared, 2 to 8 pounds of active ingredient will prevent the further development of crabgrass. There is no perceptible injury to Kentucky bluegrass, bentgrass or creeping red fescue.

As an application on established lawns after the crabgrass emerges to the 3 leaf stage, 3 to 16 pounds per acre of active ingredient will prevent the further development of crabgrass without injury to the established lawn grasses.

The compounds of this invention can also be applied directly to the soil as pre-emergence or as post-emergence treatments to the locus of growing cheat. Rates of application can be in the range of ½ to 8 pounds per acre and will preferably be used at the rate of 1 to 6 pounds per acre.

More specifically, as a pre-emergence application on wheat lands, 1 to 3 pounds per acre of a compound used in this invention will control the growth of cheat, and thereby encourage the growth of wheat.

The compounds of this invention can also be applied admixed with other chemicals which are used in agronomic and horticultural management and are compatible with the compounds of this invention. Such chemicals may be, but are not restricted to, the classes of chemicals commonly known as plant nutrients, fertilizers, insecticides, fungicides, herbicides and nematocides. Typical of the insecticides that can be used are:

1,2,3,4,10,10-hexachloro-6,7-epoxy-1,4,4a,5,6,7,8,8a-octahydro-1,4,5,8-dimethanonaphthalene (Dieldrin), 1–2 pounds per acre
1,2,4,5,6,7,8,8-octachloro-4,7-methano-3a,4,7,7a-tetrahydroindane (Chlordane), 2.5–10 pounds per acre
1,1,1-trichloro-2,2-bis(p-methoxyphenyl)ethane (Methoxychlor), 2–4 pounds per acre
1,1,1-trichloro-2,2-bis(p-chlorophenyl)ethane (DDT), 10–20 pounds per acre and
1-naphthyl-N-methylcarbamate ("Sevin") 2–4 pounds per acre.

Insecticides in compositions of this invention are present at the rate of 0.1 to 10 parts by weight for each one part by weight of a compound of Formula I.

Fungicides that can be used in conjunction with the compounds of this invention include:

metal salts of ethylene bisdithiocarbamic acid, e.g. sodium, manganese, zinc and iron salts; N-trichloromethylmercapto-4-cyclohexene-1,2-dicarboximide;
phenylmercury acetate;
inorganic mercury salts;
methylmercury dihydroxypropyl mercaptide;
methylmercury acetate;
N-trichloromethylthiophthalimide;
2,3-dichloro-1,4-naphthoquinone;
2,3,5,6-tetrachloro-1,4-benzoquinone;
2,4-dichloro-6-(o-chloroanilino)-s-triazine;
copper A;
metal salts of alkyl and dialkyl dithiocarbamic acid, e.g. Zn, Na, K, Fe, Mn, Ni;
zinc pyridinethione;

S-(1-oxido-2-pyridyl)-isothiuronium chloride;
tetrachloroisophthalonitrile;
tetramethylthiuram disulfide;
hydroxymercurichlorophenol and mixtures of these last two, and methyl mercury dicyandiamide.

The above-described fungicides are used at the rate of .02 to 10 parts by weight based on the weight of the compound of Formula I.

The control of weed grasses with compounds of Formula I is advantageously accomplished together with the use of conventional herbicides in situations where crabgrass is growing with weeds controlled by the second herbicide.

Illustrative of herbicides that can be used in conjunction with the compounds of this invention in sprays and granular formulations to take weeds out of desirable plants are the following:

| Lbs./Acre | Herbicide | Desirable Plants |
| --- | --- | --- |
| 1-3 | 2,4-dichlorophenoxyacetic acid. | Sugar cane and roadside and lawn turf grasses. |
| 0.3-1 | 2,4,5-trichlorophenoxyacetic acid. | Roadside and lawn turf grasses. |
| 0.5-1.5 | 2,4,5-trichlorophenoxypropionic acid. | Do. |
| 2-4 | 3-amino-2,5-dichlorobenzoic acid. | Soybeans. |
| 1-4 | 2,4-bis(isopropylamino)-6-methylmercapto-s-triazine. | Soybeans, cotton and sugar cane. |
| 1-4 | 1-n-butyl-3-(3,4-dichlorophenyl)-1-methylurea. | Ornamentals and lawn turf grasses. |
| 1-3 | 2-chloro-4,6-bis(ethylamino)-s-triazine. | Ornamentals. |
| 1-4 | 2-chloro-4-ethylamino-6-isopropylamino-s-triazine. | Sugar cane and pineapples. |
| 1-4 | 3-(p-chlorophenyl)-1,1-dimethylurea. | Do. |
| 0.5-2 | 4-(2,4-dichlorophenoxy)-butyric acid. | Alfalfa and other legumes. |
| 0.5-2 | 2-methyl-4-chlorophenoxybutyric acid. | Do. |
| 1-4 | 3-(3,4-dichlorophenyl)-1,1-dimethylurea. | Sugar cane, pineapple, grass seed crops and alfalfa. |
| 1-4 | N-(3,4-dichlorophenyl)-methacrylamide. | Cotton. |
| 1-4 | 3-(3,4-dichlorophenyl)-1-methoxy-1-methylurea. | Soybeans. |
| 1-4 | 1,2-dihydropyridazine-3,6-dione. | Roadside turf grasses. |
| 1-4 | 2-ethylamino-4-isopropylamino-6-methylmercapto-s-triazine. | Sugar cane. |
| 2-4 | N,N-dimethyl-α,α-diphenylacetamide. | Tobacco and tomatoes. |
| 2-6 | 1-(p-chlorophenoxyphenyl)-3,3-diethylurea. | Soybean and peanuts and field beans. |
| 1-3 | Sodium 2,4-dichlorophenoxyethylsulfate. | Soybeans. |
| 1-3 | Octyl dodecyl ammonium salts of methyl arsonate. | Turf. |
| 1-3 | Disodium methylarsonate. | Turf and cotton. |
| 1-5 | Dimethyl ester of tetrachloro terephthalic acid. | Turf. |

The amount of second herbicide set forth in the left column is in addition to the heretofore indicated dosage of compound from Formula I.

The above can be in the form of salts or non-volatile ester formulations. Also contact herbicides can be included, such as cacodylic acid, potassium cyanate, dinitrosec.-butyl phenol, 1,1′-ethylene-2,2′-dipyridylium dibromide (diquat) and 1,1′-dimethyl-4,4′-bipyridylium dichloride (paraquat).

Fertilizers commonly called plant nutrients can also be applied together with the compounds of this invention. The plant nutrients include the commonly used compounds of nitrogen, phosphorus, and potassium; i.e. ammonium sulfate, ammonium nitrate, urea, methylene ureas, low molecular weight urea-formaldehyde polymers, sodium nitrate, anhydrous ammonia, aqueous ammoniacal solutions of urea, or ammonium nitrate, aqueous solutions of urea, or ammonium nitrate, ammonium phosphates, superphosphates, triple superphosphates and phosphoric acid and the potassium salts such as the chloride, sulfate and nitrate. The plant nutrients are applied individually or in a mixture with each other as so-called "complete mixtures" of N-P-K which may also contain one or more of the "trace element" plant nutrients; i.e., manganese, zinc, iron, boron, magnesium, etc.

The compound of Formula I is preferably added to such fertilizer mixtures or compounds following the usual mixing, ganulation, ammoniation, drying or other manufacturing operations to avoid possible adverse effects of such operations on the efficacy of the compound as a weed grass control agent.

It is understood that the compounds and compositions of this invention are applied to the "locus" of the grass growth. By "locus" is meant the plant itself when visible above the ground and when the plant is not visible the immediate area of soil where the grass plant is developing.

The following additional examples, in which all percents unless otherwise specified are by weight, are provided so as to more clearly explain this invention.

Example 1

A solution of 2-cyclohexen-1-ylamine (4.0 g., 0.0412 mole) in 15 cc. hexane is treated with phenyl isocyanate (4.8 g., 0.0403 mole) in 15 cc. hexane. An exothermic reaction is noticed and a white precipitate is formed. After standing overnight the precipitate is filtered off, washed with hexane and dried (4.0 g., 0.0185 mole, 45%), M.P. 202–204°. The product is 1-(2-cyclohexen-1-yl)-3-phenylurea.

Cal'd for $C_{13}H_{16}N_2O$ (216.3): N, 12.95. Found: N, 12.83.

The following granular formulation can be used for most solid cycloalkenylphenylureas of this invention melting above 90° C. A wettable powder is first prepared by micropulverizing the following ingredients:

|  | Percent |
| --- | --- |
| 1-(2-cyclohexen-1-yl)-3-phenylurea | 50 |
| Attapulgite clay | 48 |
| Dioctyl sodium sulfosuccinate | 1 |
| Sodium lignin sulfonate | 1 |

The wettable powder is distributed over the surface of No. 4 vermiculite by tumbling together. To make the combination more adherent the mix is sprayed with a mixture of ethylene glycol and water. The final ratio of ingredients is as follows:

|  | Percent |
| --- | --- |
| 50% active wettable powder | 4 |
| No. 4 vermiculite | 86 |
| Ethylene glycol | 5 |
| Water | 5 |

In a modification of the above formulation the ethylene glycol may be replaced by a mixture of the sodium sulfates of mixed long chain alcohol fatty acid esters and diethylene glycol acetate in a ratio between 1:10 and 10:1 by weight.

The granular formulation described above has utility as a pre-emergence treatment for controlling crabgrass in an established Kentucky bluegrass-creeping red fescue lawn. The material is applied with a granule spreader at the rate of 8 pounds of active ingredient per acre prior to the germination of crabgrass. Such excellent retardation of crabgrass is obtained that it presents no competition to the established lawn. Some retardation of the established lawn species without injury is noted.

This formulation is used also for the retardation of crabgrass in crops belonging to the Cruciferae family. A pre-emergence application of 2 to 3 pounds of active ingredient per acre essentially stops the growth of crabgrass shortly after it emerges from the soil. A planting of mustard shows no injurious effects from the treatment.

Examples 2–20

The following cycloalkenylphenylurea products are prepared in the manner of the 1-(2-cyclohexen-1-yl)-3-phenylurea of Example 1 by substituting for the 2-cyclohexen-1-ylamine and phenyl isocyanate of Example 1, a like amount by weight of the following cycloalkenylamines and isocyanates.

The products are formulated and applied in like manner to provide like results.

| Amine | Isocyanate | Cycloalkenylphenylurea Product |
|---|---|---|
| 2-cycloocten-1-yl- | o-Fluorophenyl- | 1-(2-cycloocten-1-yl)-3-o-fluorophenylurea. |
| 2-cycloocten-1-yl- | m-Tolyl- | 1-(2-cycloocten-1-yl)-3-m-tolylurea. |
| 2-cycloocten-1-yl- | p-Tolyl- | 1-(2-cycloocten-1-yl)-p-tolylurea. |
| 2-cycloocten-1-yl- | o-Tolyl- | 1-(2-cycloocten-1-yl)-o-tolylurea. |
| 4-cycloocten-1-yl- | Phenyl- | 1-(4-cycloocten-1-yl)-3-phenylurea. |
| 4-cycloocten-1-yl- | o-Fluorophenyl- | 1-(4-cycloocten-1-yl)-3-o-fluorophenylurea. |
| 2-cyclohepten-1-yl- | Phenyl- | 1-(2-cyclohepten-1-yl)-3-phenylurea. |
| 3-cyclohexen-1-methyl- | Phenyl- | 1-(3-cyclohexen-1-methyl)-3-phenylurea. |
| 1-cyclohexen-1-yl- | Phenyl- | 1-(1-cyclohexen-1-yl)-3-phenylurea. |
| 1-cyclohexen-1-methyl- | Phenyl- | 1-(1-cyclohexen-1-methyl)-3-phenylurea. |
| 3-cyclohexen-1-yl- | Phenyl- | 1-(3-cyclohexen-1-yl)-3-phenylurea. |
| 2-cyclopenten-1-yl- | Phenyl- | 1-(2-cyclopenten-1-yl)-3-phenylurea. |
| 3-cyclopenten-1-yl- | Phenyl- | 1-(3-cyclopenten-1-yl)-3-phenylurea. |
| 2-methyl-2-cyclohexen-1-yl- | Phenyl- | 1-(2-methyl-2-cyclohexen-1-yl)-3-phenylurea. |
| 2-methyl-2-cyclohexen-1-yl- | o-Fluorophenyl- | 1-(2-methyl-2-cyclohexen-1-yl)-3-o-fluorophenylurea. |
| 2-methyl-2-cyclohexen-1-yl- | m-Tolyl- | 1-(2-methyl-2-cyclohexen-1-yl)-3-m-tolylurea. |
| 4-methyl-2-cyclohexen-1-yl- | Phenyl- | 1-(4-methyl-2-cyclohexen-1-yl)-3-phenylurea. |
| 4-methyl-2-cyclohexen-1-yl- | o-Fluorophenyl- | 1-(4-methyl-2-cyclohexen-1-yl)-3-o-fluorophenylurea. |
| 5-methyl-2-cyclohexen-1-yl- | Phenyl- | 1-(5-methyl-2-cyclohexen-1-yl)-3-phenylurea. |

Example 21

2-cycloocten-1-ylbromide (30.66 g., 0.162 mole) is treated with 200 cc. of aqueous ammonium hydroxide at 95–96° C. for one hour. The mixture is extracted three times with 100 cc. of ether. The ether extract is washed one time with 100 cc. of water. The ether is then extracted two times with 100 cc. of 10% hydrochloric acid. The aqueous layer is brought to pH 10 with 5% aqueous sodium hydroxide and extracted three times with 100 cc. of ether. The ether extract is dried, stripped and the yellow oil distilled. A fraction of colorless liquid B.P. 59–60° C. is taken and treated with phenyl isocyanate in 20 cc. hexane to give an immediate white precipitate. (1.7 g., 0.007 mole), M.P. 179–181° C. The product is 1-(2-cycloocten-1-yl)-3-phenylurea.

Cal'd for $C_{15}H_{20}N_2O$ (244.3): N, 11.06. Found: N, 11.70.

The following pellet formulation is applicable to any cycloalkenylphenylurea used in this invention.

| | Percent |
|---|---|
| 1-(2-cycloocten-1-yl)-3-phenylurea | 11 |
| Anhydrous sodium sulfate | 10 |
| Mississippi sub-bentonite | 33 |
| Kaolin clay | 33 |
| Lignin sodium sulfonate | 13 |

These ingredients are mixed and blended by micropulverizing. Approximately 18% water as calculated on a wet basis is added to the formulation and thoroughly mixed. The resulting product is extruded into pellets through a screw type extruder fitted with a die containing orifices of 3/32 inch. The extruded strands are conveniently cut into small pellets as they come out of the extruder die. The pellets are air dried. After drying the pellets can be easily handled and applied as such. However, they readily soften and disintegrate when mildly agitated in water and can also be applied in water rather than as the pellets.

Example 22

The following granular formulation has general application to the compounds of this invention

| | Percent |
|---|---|
| 1-(2-cycloocten-1-yl)-3-o-fluorophenylurea | 2 |
| 15–30 mesh attaclay granules | 98 |

The active material can be applied to the attaclay granules in several ways. (1) The active material may be dissolved in a volatile solvent such as acetone and sprayed on the tumbling granules, or (2) wettable powder containing the active material can be distributed on the surface of the granules. By moistening with water or a mixture of water and ethylene glycol dusting off is prevented. In other granular formulations, if the melting point of the active ingredient is below about 99° C., the active ingredient can be melted and sprayed over a tumbling mass of preferred clay-, vermiculite-, or similar granules.

This granular formulation is applied pre-emergence with a granule spreader at the rate of 2–6 pounds of active ingredient per acre for the control of growth of crabgrass in an established bluegrass-meadow fescue lawn. The crabgrass emerges from the soil but fails to grow normally. The established lawn grasses show slight retardation with no objectionable injury.

Example 23

The following wettable powder is applicable to the low melting solids described in the examples as well as all the high melting solid compounds of this invention.

| | Percent |
|---|---|
| 1-(2-cycloocten-1-yl)-3-o-tolylurea | 25.00 |
| Alkyl naphthalene sulfonic acid, Na salt | 1.00 |
| Low viscosity methyl cellulose | 0.25 |
| Attapulgite clay | 73.75 |

The above components are blended and micropulverized until homogeneous and then reblended.

The formulation described above is applied pre-emergence at the rate of 4–8 pounds of active ingredient per acre in 100 gallons of water for the control of growth of crabgrass in an established bluegrass-fescue lawn. Excellent control of crabgrass is obtained without noticeable damage to the desirable turf grasses.

The above formulation can be applied pre-emergence at 2–6 pounds per acre of active ingredient to control crabgrass, foxtails, seedling Johnsongrass and barnyard grass in peanuts and soybeans.

Example 24

The following emulsifiable oil can be extended with either oil or water.

| | Percent |
|---|---|
| 1-(2-cycloocten-1-yl)-3-m-tolylurea | 20 |
| A blend of polyoxyethylene ethers and oil soluble sulfonates | 5 |
| Alkylated naphthalene (principally α-methylnaphthalene) | 75 |

The above components are blended and agitated until a homogeneous mixture is obtained.

This emulsifiable formulation is extended with 80 gallons of herbicidal oil and applied at the rate of 12 pounds active ingredient per acre to an area infested with crabgrass. Excellent growth regulation of crabgrass is obtained. Weed seeds germinating after treatment show severe retardation.

A pre-emergence application of the above formulation at the rate of 2 to 4 pounds of active ingredient per acre in 40 gallons of water gives excellent retardation of crabgrass in a newly planted field of soybeans.

Example 25

The 1-(2-cycloocten-1-yl)-3-phenylurea prepared as in Example 21 is formulated into a wettable powder as follows:

| | Percent |
|---|---|
| 1-(2-cycloocten-1-yl)-3-phenylurea tech | 52.6 |
| Partially desulfonated sodium lignin sulfonate ("Marasperse" CBS) | 1.5 |
| Sodium dioctylsulfosuccinate concreted with benzoic acid ("Aerosol" OT–B) | 2.0 |
| Disodium hydrogen phosphate | 2.5 |
| Synthetic fine silica ("HiSil" 233) | 2.5 |
| Hydrated attapulgite ("Attaclay") | 38.9 |

The above ingredients are mixed and micropulverized to a particle size of less than 50 microns and then reblended.

The above formulation is applied pre-emergence at the rate of 10 pounds of active per acre in 200 gallons water to a newly seeded spring lawn containing Kentucky bluegrass, creeping red fescue and annul ryegrass. A heavy infestation of crabgrass emerges but fails to develop. The desirable turf grasses emerge and grow normally to form a good lawn cover.

The formulation above is also applied to a rice field immediately after the rice is seeded. The application rate is 1 to 4 pounds of active ingredient. Excellent control is achieved on barnyardgrass and junglerice.

This formulation is also supplied at 2 to 6 pounds per acre of active ingredient for pre-emergence control of annual grasses such as crabgrass, foxtail, barnyard, seedling Johnsongrass in a newly planted field of cotton.

In addition, the 1-(2-cycloocten-1-yl)-3-phenylurea wettable powder described above is further formulated into 5% active granules.

| | Percent |
|---|---|
| 1-(2-cycloocten-1-yl)-3-phenylurea (as a 50% active wettable powder) | 10 |
| No. 4 vermiculite | 80 |
| Nonylphenol polyethylene glycol ether | 5 |
| Water | 5 |

The wettable powder and the vermiculite are dry blended. The surfactant and water are combined and sprayed on the dry ingredients which are being tumbled in a blender.

This granular formulation is applied in the spring with a lawn spreader at the rate of 10 pounds of active compound per acre for the pre-emergence control of crabgrass in an established bluegrass-red fescue lawn. Prior to application of the growth retardant, bare spots in the lawn, due to previous crabgrass infestations, are reseeded to bluegrass and fescue. The germinating lawn grasses emerge and grow normally. Excellent control of crabgrass is obtained. The crabgrass barely emerges and fails to grow.

Example 26.—A 10–5–5 fertilizer mixture

| | Percent |
|---|---|
| Diammonium phosphate | 10.9 |
| Ammonium sulfate | 36.5 |
| Tankage (4% N) | 15.0 |
| Potassium chloride | 8.4 |
| 1-(2-cycloocten-1-yl)-3-phenylurea | 0.6 |
| Limestone | 28.6 |

The above mixture is prepared by blending the ingredients in regular fertilizer blending equipment. An application of 40 pounds of this mixture to 1000 square feet of turf gives a treatment of 1-(2-cycloocten-1-yl)-3-phenylurea at a rate of 10 pounds per acre. An application of this mixture to established turf before germination of weed grasses will result in good control of crabgrass and other seedling weed grasses, such as foxtail and barnyard grass.

Example 27.—A 20–10–10 fertilizer mixture

| | Percent |
|---|---|
| Diammonium phosphate | 21.70 |
| Urea | 17.50 |
| Ammonium sulfate | 39.50 |
| Potassium chloride | 16.70 |
| 1-(2-cycloocten-1-yl)-3-phenylurea | 0.92 |
| Tankage (4% N) | 3.68 |

This mixture is prepared by blending the ingredients in regular fertilizer blending equipment. An application of this mixture to turf at a rate of 20 pounds per 1000 square feet gives a treatment of 8 pounds per acre of 1-(2-cycloocten-1-yl)-3-phenylurea. The use of this mixture on turf at the indicated rate will result in good pre-emergence control of seedling weedy grasses such as crabgrass, barnyardgrass and foxtails.

Thirty pounds of this fertilizer mixture gives excellent control of crabgrass in the 2 to 3 leaf stage.

Example 28

2-methylcyclohexylisocyanate (4.27 g., 0.0308 mole) in 10 cc. of hexane is added dropwise to a solution of 2-cyclohexen-1-ylamine (3.00 g., 0.0308 mole) in 10 cc. hexane. An immediate precipitate is formed. The mixture is allowed to stand overnight. The precipitate is filtered off, washed with hexane and dried. (2.16 g., 0.0915 mole, 30%), M.P. 214–216° C. The product is 1-(2-cyclohexen-1-yl)-3-(2-methylcyclohexyl)urea. It is extracted one time with methanol-water to give the analytical sample, M.P. 217–220° C.

Calc'd for $C_{14}H_{24}N_2O$ (236.4): N, 11.95. Found: N, 11.83.

The following granular composition is formulated:

| | Percent |
|---|---|
| 1-(2-cyclohexen-1-yl)-3-(2-methylcyclohexyl)urea | 2 |
| 15–30 mesh attaclay granules | 98 |

The active material can be applied to the attaclay granules in several ways. (1) The active material can be dissolved in a volatile solvent such as acetone and sprayed on the tumbling granules, or (2) wettable powder containing the active matreial can be distributed on the surface of the granules. By moistening with water or a mixture of water and ethylene glycol dusting off is prevented. In other granular formulation, if the melting point of the active ingredient is below about 90° C., the active ingredient can be melted and sprayed over a tumbling mass of preformed clay-, vermiculite-, or similar granules.

This granular formulation is applied pre-emergence with a granule spreader at the rate of 4 to 12 pounds active ingredient per acre for the control of growth of crabgrass and foxtails in an area of established bluegrass-meadow fescue. The crabgrass and foxtails emerge from the soil but fail to grow.

Examples 29–58

The following cycloalkenylcycloalkylurea and 1,3-dicycloalkenylurea products are prepared in the manner of the 1 - (2 - cyclohexen - 1 - yl) - 3 - (2 - methylcyclohexyl)urea of Example 28 by substituting for the 2-methylcyclohexylisocyanate and 2-cyclohexen-1-ylamine respectively a like amount by weight of the following isocyanates and amines.

The products are formulated and applied in like manner to provide like results.

| | Amine | Isocyanate | Cycloalkenyl-3-cycloalkylurea Product |
|---|---|---|---|
| 29 | 2-cycloocten-1-yl- | Cyclooctyl- | 1-(2-cycloocten-1-yl)-3-cyclooctylurea. |
| 30 | 2-cycloocten-1-yl- | 2-chlorocyclohexyl- | 1-(2-chlorocyclohexyl)-3-(2-cycloocten-1-yl)urea. |
| 31 | 2-cycloocten-1-yl- | Cycloheptyl- | 1-(cycloheptyl)-3-(2-cycloocten-1-yl)urea. |
| 32 | 2-cycloocten-1-yl- | Norbornylmethyl- | 1-(2-cycloocten-1-yl)-3-(2-norbornylmethyl)urea. |
| 33 | 2-cycloocten-1-yl- | Bicyclooctyl- | 1-(bicyclooctyl)-3-(2-cycloocten-1-yl)urea. |
| 34 | 1-(cyclohexen-1-ylmethyl)- | Cyclooctyl- | 1-cyclooctyl-3-(cyclohexen-1-yl)methylurea. |
| 35 | 1-(cyclohexen-1-ylmethyl)- | 2-methylcyclohexyl- | 1-(cyclohexen-1-yl)methyl-3-(2-methylcyclohexyl)urea. |
| 36 | 2-cycloocten-1-yl- | Chloronorbornyl- | 1-(chloronorbornyl)-3-(2-cycloocten-1-yl)urea. |
| 37 | 2-cycloocten-1-yl- | 2,2-Dimethylbicyclo-[3.2.1]oct-3-yl- | 1-(cyloocten-1-yl)-3-(2,2-dimethyl-bicyclo[3.2.1]oct-3-yl)urea. |
| 38 | 2-cycloocten-1-yl- | Bicyclo-[3.2.1]oct-2-yl- | 1-(2-cycloocten-1-yl)-3-(bicyclo-[3.2.1]oct-3-yl)urea. |
| 39 | 2-cycloocten-1-yl- | Bicyclo-[2.2.2]oct-2-yl- | 1-(bicyclo[2.2.2]oct-2-yl)-3-(2-cycloocten-1-yl)-urea. |
| 40 | 2-cycloocten-1-yl- | (Bicyclo-[2.2.2]oct-2-yl)methyl- | 1-(bicyclo[2.2.2]oct-2-yl-methyl)-3-(2-cycloocten-1-yl)urea |
| 41 | 2-cycloocten-1-yl- | (Bicyclo-[3.2.1]oct-2-yl)-methyl- | 1-(bicyclo[3.2.1]oct-2-yl-methyl)-3-(2-cycloocten-1-yl)urea. |
| 42 | 2-cycloocten-1-yl- | 2-methylcyclopentyl- | 1-(2-cycloocten-1-yl)-3-(2-methylcyclopentyl)-urea. |

| | Amine | Isocyanate | Urea Product |
|---|---|---|---|
| 43 | 2-cycloocten-1-yl- | 3-methyl-2-norbornyl- | 1-(2-cycloocten-1-yl)-3-(3-methyl-2-norbornyl)urea. |
| 44 | 2-cycloocten-1-yl- | 1,7-dimethyl-2-norbornyl- | 1-(2-cycloocten-1-yl)-3-(1,7-dimethyl-2-norbornyl)urea. |
| 45 | 2-cycloocten-1-yl- | cyclohexylmethyl- | 1-(2-cycloocten-1-yl)-3-cyclohexylmethylurea. |
| 46 | 4-cycloocten-1-yl- | cyclohexylmethyl- | 1-(4-cycloocten-1-yl)-3-cyclohexylmethylurea. |
| 47 | 2-cyclohepten-1-yl- | cyclohexylmethyl- | 1-(2-cyclohepten-1-yl)-3-cyclohexylmethylurea. |
| 48 | 3-cyclohexen-1-methyl- | cyclohexylmethyl- | 1-(3-cyclohexen-1-methyl)-3-cyclohexyl-methylurea. |
| 49 | 1-cyclohexen-1-yl- | cyclohexylmethyl- | 1-(1-cyclohexen-1-yl)-3-cyclohexylmethylurea. |
| 50 | 1-cyclohexen-1-methyl- | cyclohexylmethyl- | 1-(1-cyclohexen-1-methyl)-3-cyclohexylmethylurea. |
| 51 | 3-cyclohexen-1-yl- | cyclohexylmethyl- | 1-(3-cyclohexen-1-yl)-3-cyclohexylmethylurea. |
| 52 | 2-cyclopenten-1-yl- | cyclohexylmethyl- | 2-(2-cyclopenten-1-yl)-3-cyclohexylmethylurea. |
| 53 | 3-cyclopenten-1-yl- | cyclohexylmethyl- | 3-(3-cyclopenten-1-yl)-3-cyclohexylmethylurea. |
| 54 | 2-methyl-2-cyclohexen-1-yl- | cyclohexylmethyl- | 1-cyclohexylmethyl-3-(2-methyl-2-cyclohexen-1-yl)urea. |
| 55 | 4-methyl-2-cyclohexen-1-yl- | cyclohexylmethyl- | 1-cyclohexylmethyl-3-(4-methyl-2-cyclohexen-1-yl)urea. |
| 56 | 5-methyl-2-cyclohexen-1-yl- | cyclohexylmethyl- | 1-cyclohexylmethyl-3-(5-methyl-2-cyclohexen-1-yl)urea. |
| 57 | 2-cycloocten-1-yl- | 2-cyclopentenyl- | 1-(2-cycloocten-1-yl)-3-(2-cyclopenten-1-yl)urea. |
| 58 | 2-methylcyclohexen-2-yl- | 3-cycloocten-1-yl- | 1-(2-methylcyclohexen-2-yl)-3-(3-cycloocten-1-yl)urea. |

Example 59

Cyclohexylmethylamine (4.00 g., 0.0354 mole) is slowly dropped in as a solution in 25 cc. of hexane to a solution of phosgene (3.0 ml., 0.0443 mole) in 100 cc. of toluene at 0–5° C. After addition the mixture is heated to reflux until all the hydrogen chloride is driven off. Dry nitrogen is bubbled into the mix to hasten this removal. After all hydrogen chloride is removed (about 5 hr.), the solution is cooled and the precipitate is filtered off. The filtrate is then rapidly dropped into a solution of 2-cyclohexen-1-ylamine (3.34 g., 0.0354 mole) in 50 cc. of toluene. The solution became milky and exothermic. The mixture is heated to 60° C. for one-half hour. It is cooled and stripped leaving an oil which upon trituration with hexane gives a white precipitate (3.94 g., 0.0167 mole, 47% M.P. 142–145° C.). It is washed once with benzene-hexane and one time with methanol-water to give the product, 1-(2-cyclohexen-1-yl) - 3 - cyclohexylmethylurea, M.P. 155–156° C.

*Analysis.*—Calcd. N, 11.85. Found N, 11.89.

The following wettable powder is suitable for any of the compounds described which melt above 90° C.:

| | Percent |
|---|---|
| 1-(2-cyclohexen-1-yl)-3-(cyclohexylmethyl)urea | 50 |
| Diatomaceous silica | 48 |
| Coconut acid ester of sodium isethionate | 1 |
| Sodium lauryl sulfate | 1 |

The ingredients are blended and micropulverized to pass a 60 mesh screen.

This wettable powder formulation in the amount of 8 to 12 pounds of active ingredient per acre is added to 80 gallons of water in a spray tank. Six pounds of a surfactant such as trimethylnonyl ether of polyethylene glycol with ethylene oxide is added to this mixture. This tank spray mixture is applied to an area which is infested with Johnsongrass and crabgrass in the 1 to 2-leaf stage. Excellent retardation of these species is obtained. They turn dark green, show very slow growth and their root systems fail to develop normally.

Example 60

The following granular formulation can be used for most solid cyclooctenylcycloalkylureas used in this invention. A wettable powder is first prepared by micropulverizing ingredients such as the following:

| | Percent |
|---|---|
| 1-(cyclohexylmethyl)-3-(2-cycloocten-1-yl)urea | 50 |
| Dioctylsodium sulfosuccinate | 1 |
| Attapulgite clay | 48 |
| Sodium lignin sulfonate | 1 |

The wettable powder is distributed over the surface of No. 4 vermiculite by tumbling together. To make the combination more adherent the mix is sprayed with a mixture of ethylene glycol and water. The final ratio of ingredients is as follows:

| | Percent |
|---|---|
| 50% active wettable powder | 4 |
| No. 4 vermiculite | 86 |
| Ethylene glycol | 5 |
| Water | 5 |

In a modification of the above formulation the ethylene glycol may be replaced by a mixture of the sodium sulfates of mixed long chain alcohol fatty acid esters and diethylene glycol acetate in a ratio between 1:10 and 10:1 by weight.

The granular formulation described above has utility as a pre-emergence treatment for retarding the growth of crabgrass, foxtail and barnyardgrass in an area containing established perennial grasses such as Kentucky bluegrass, bentgrass or creeping red fescue. The material is applied with a granule spreader at the rate of 12 pounds of active ingredient per acre prior to the germination of crabgrass. Such excellent retardation of crabgrass is obtained that it presents no competition to the established perennials. The established perennial species exhibit good growth.

This formulation is used also for the control of crabgrass in crops belonging to the bean family. A pre-emergence application of 4 to 8 pounds of active ingredient per acre essentially stops the growth of crabgrass shortly after it germinates.

What is claimed is:
1. A method for controlling the growth of seedling weed grasses comprising applying to a locus of growth of said grasses a growth controlling amount of a compound of the formula

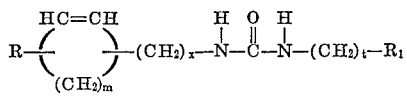 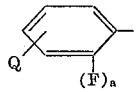

wherein R is hydrogen or methyl; R₁ is saturated cycloalkyl containing 5 through 8 carbon atoms; saturated bicycloalkyl containing 7 through 8 carbon atoms; monomethyl-, dimethyl-, monohalo-, dihalo- or monomethyldihalosubstituted saturated cycloalkyl containing 5 through 8 carbon atoms or saturated bicycloalkyl containing 7 through 8 carbon atoms; cycloalkenyl containing 5 through 8 carbon atoms; or methyl-substituted cycloalkenyl where the cycloalkenyl radical contains 5 through 8 carbon atoms; with the limitation that the radicals attached to the 1 and 3 positions of the urea moiety must be different when both $t$ and $x$ are 0;

$a$ is 0 or 1;

$m$ is a whole integer more than 2 and less than 7;

$t$ is 0 or 1;

$x$ is 0 or 1; and

Q is hydrogen or methyl.

2. The method according to claim 1 wherein the compound applied is 1-(2-cycloocten-1-yl)-3-m-tolylurea.

3. The method according to claim 1 wherein the compound applied is 1-(2-cycloocten-1-yl)-3-o-fluorophenylurea.

4. The method according to claim 1 wherein the compound applied is 1-(2-cycloocten-1-yl)-3-phenylurea.

5. The method according to claim 1 wherein the compound applied is 1-(2-cycloocten-1-yl)-3-cyclohexylmethylurea.

6. The method according to claim 1 wherein the compound applied is 1-(2-cyclohexen-1-yl)-3-cyclohexylmethylurea.

References Cited

UNITED STATES PATENTS

| | | | |
|---|---|---|---|
| 3,141,758 | 7/1964 | Hamm et al. | 71—2.6 |
| 3,309,192 | 3/1967 | Luckenbaugh | 71—2.6 |

JAMES O. THOMAS, Jr., *Primary Examiner.*